(12) United States Patent
Mathiske et al.

(10) Patent No.: US 7,100,015 B1
(45) Date of Patent: Aug. 29, 2006

(54) REDIRECTING EXTERNAL MEMORY ALLOCATION OPERATIONS TO AN INTERNAL MEMORY MANAGER

(75) Inventors: Bernd J. W. Mathiske, Cupertino, CA (US); Teck Yang Lee, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 360 days.

(21) Appl. No.: 10/663,604

(22) Filed: Sep. 15, 2003

(51) Int. Cl.
*G06F 12/00* (2006.01)
(52) U.S. Cl. ...................................... 711/170; 707/206
(58) Field of Classification Search ...................... None
See application file for complete search history.

(56) References Cited

U.S. PATENT DOCUMENTS 6,401,182 B1 * 6/2002 Sweeney .................... 711/171
6,760,815 B1 * 7/2004 Traversat et al. ........... 711/135

FOREIGN PATENT DOCUMENTS

WO WO 01/95106 A2 * 12/2001

* cited by examiner

*Primary Examiner*—Mano Padmanabhan
*Assistant Examiner*—Craig E Walter
(74) *Attorney, Agent, or Firm*—Park, Vaughan & Fleming LLP

(57) ABSTRACT

One embodiment of the present invention provides a system that facilitates redirecting external memory allocation operations, generated during calls by an application to external library functions, to an internal memory manager within the application. The system starts by encountering a call to an external library function during execution of the application. The system then determines if the external library function can call an internal memory allocation function, and if so, redirects the call to an internal memory allocation function within the application.

21 Claims, 3 Drawing Sheets

REDIRECTING EXTERNAL MEMORY ALLOCATION OPERATIONS TO AN INTERNAL MEMORY MANAGER

BACKGROUND

1. Field of the Invention

The present invention relates to techniques for allocating memory within a computer system. More specifically, the present invention relates to a method and an apparatus for redirecting external memory allocation operations to an internal memory manager in order to better control the allocation of memory within a computing device.

2. Related Art

The rapid growth of the Internet, coupled with the increasing availability of wireless data networks, has led to an explosion in the number of Internet-connected devices. Virtually all devices that contain microprocessors are being connected to the Internet, including cell phones, PDAs, and personal communicators (cell phone/PDA hybrids). These devices are typically small in size to facilitate portability, which results in limited resources. Most devices in this category are memory-constrained, and hence contain limited storage space.

Due to the memory-constrained nature of these devices, effective memory management, including garbage collection, is critical to their operation. However, creating virtual machines for these memory-constrained devices that facilitate effective memory management is a challenging task.

When programming on top of existing "external" system layers that allocate memory, the programmer has no control over external memory management. In this case, memory fragmentation is highly likely, which can lead to memory exhaustion and the premature termination of executing programs due to lack of memory.

To remedy this problem, it is possible for a programmer to allocate data structures in a garbage-collected heap. This allows a compacting garbage collector to be used to reduce memory fragmentation. For data structures that cannot be easily allocated on the garbage-collected heap, a programmer can avoid making calls to an external memory manager, and can instead call internal memory allocation code, which can be tuned to avoid memory fragmentation.

Unfortunately, the above-described techniques cannot be used in all situations. For example, memory that is allocated by external libraries is outside of the control of the application. Consequently, the programmer is not able to either allocate this memory on the garbage-collected heap or to use internal memory allocation code.

What is needed is a method and an apparatus for efficiently managing memory that is allocated externally without the problems listed above.

SUMMARY

One embodiment of the present invention provides a system that facilitates redirecting external memory allocation operations, generated during calls by an application to external library functions, to an internal memory manager within the application. The system starts by encountering a call to an external library function during execution of the application. The system then determines if the external library function can call an internal memory allocation function, and if so, redirects the call to an internal memory allocation function within the application.

In a variation on this embodiment, the task of determining if the external library function can call an internal memory allocation function involves reading a pre-determined indicator value, which indicates whether the external library function can call an internal memory allocation function.

In a further variation on this embodiment, the system pre-computes a value for the pre-determined indicator value by examining the external library function to determine whether the external library function or a function called by the external library function will call a memory allocation function, and whether there are problematic references to external memory blocks allocated by the external library function.

In a variation on this embodiment, the application is a platform-independent virtual machine.

In a variation on this embodiment, the application runs in single-threaded mode on a computing device.

In a variation on this embodiment, the application runs on a memory-constrained computing device.

In a variation on this embodiment, redirecting the call to the internal memory allocation function involves executing an interpose function that calls the internal memory allocation function.

In a variation on this embodiment, the system periodically performs garbage collection on the memory allocated by the internal memory allocation function.

In a variation on this embodiment, the internal memory allocation function allocates memory in a heap.

Table 1 presents pseudo-code for a memory allocation function that selectively calls either an existing system function or internal code to perform a memory allocation operation in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Computing Device

Figure 1:
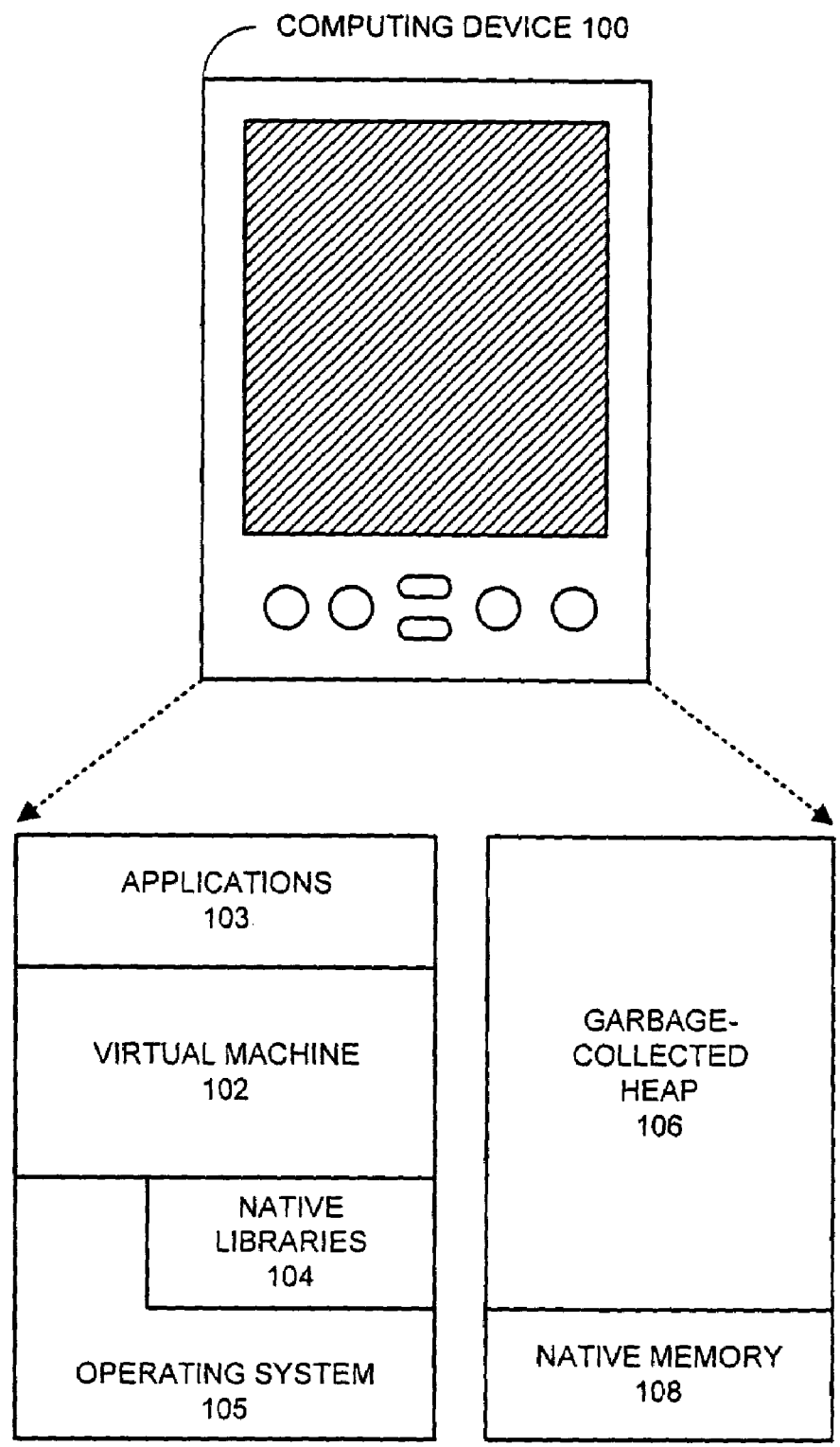
FIG. 1 illustrates a computing device in accordance with an embodiment of the present invention.

FIG. 1 illustrates a computing device 100 in accordance with an embodiment of the present invention. Computing device 100 can generally include any type of computer system, including, but not limited to, a computer system based on a microprocessor, a mainframe computer, a digital signal processor, a portable computing device, a personal organizer, a device controller, and a computational engine within an appliance.

Computing device 100 includes an operating system 105 and native libraries 104, which support execution of virtual machine 102. Virtual machine 102 can include any platform-independent virtual machine. In one embodiment of the present invention, virtual machine 102 is a JAVA VIRTUAL MACHINE (JVM). The terms JAVA, JVM, and JAVA VIRTUAL MACHINE are trademarks of SUN Microsystems, Inc. of Santa Clara, Calif.

Native library 104 contains system code that is external to virtual machine 102. For example, this system code can implement functions related to the operating system (OS) or to a graphical user interface (GUI).

Code within virtual machine 102 and native library 104 can allocate and operate on data structures in garbage-collected heap 106 as well as native memory 108, which is outside of garbage-collected heap 106.

Internal Memory Management

In order to gain control of memory management operations, an interpose function from an interpose library can be used to override the native memory allocation function with a new internal memory allocation function. This new internal memory allocation function can allocate memory from a pool that is managed by virtual machine 102. Note that an application, such as a virtual machine, can have all of its function calls intercepted by pre-linking to an interpose library created for the purpose of intercepting the function calls. Pre-linking refers to the process of dynamically linking a library to a program during a run-time invocation. This pre-linking is performed on a program that has already been compiled and linked into an executable file. In this way, the internal memory allocation functions of the present invention can be applied to any executable code, without having to modify or re-link the executable code.

Figure 2:
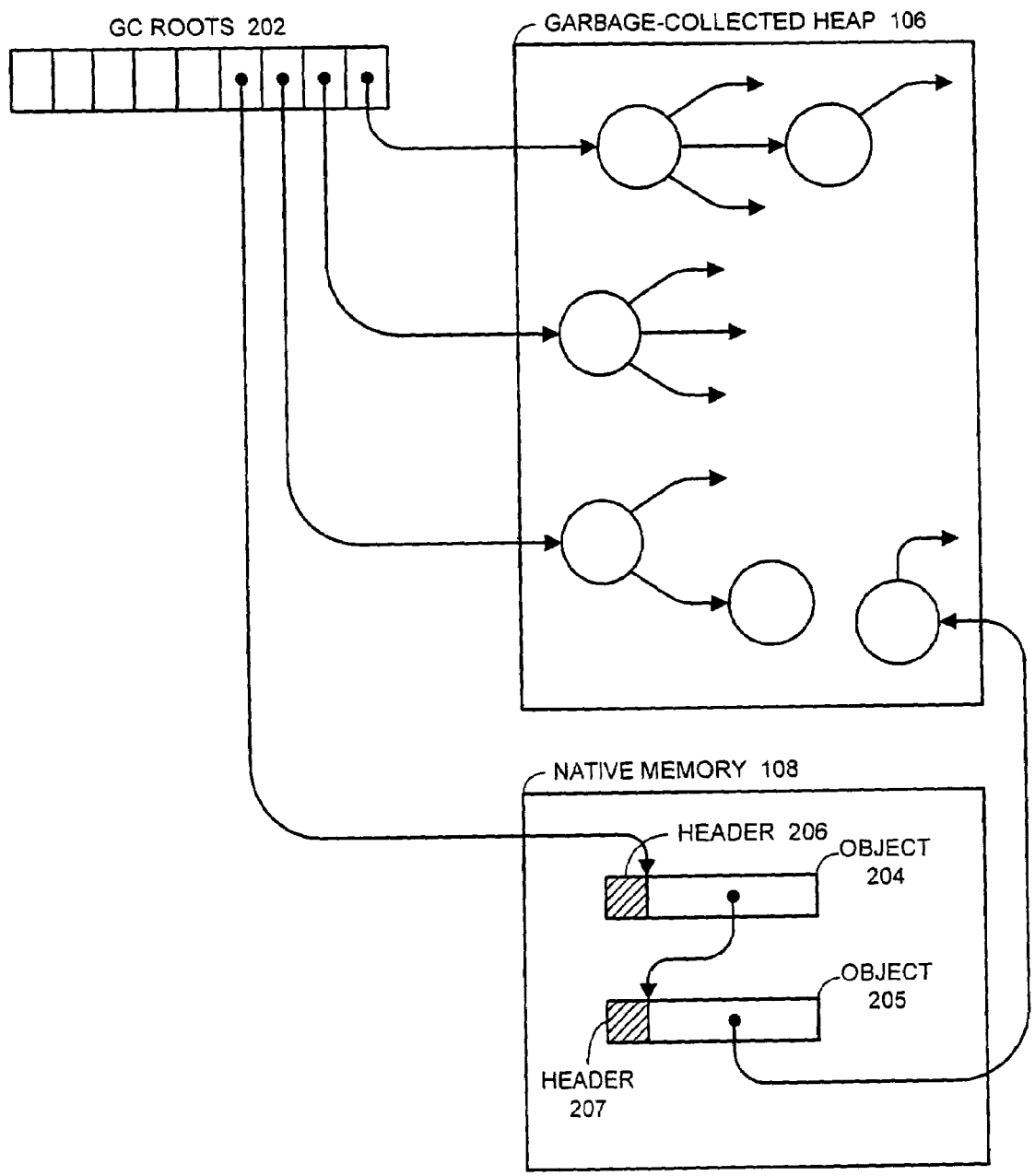
FIG. 2 illustrates data structured involved in the garbage collection process in accordance with an embodiment of the present invention.

Since the present invention allows memory to be allocated and managed internally, it is possible to modify existing garbage collection mechanisms to avoid memory fragmentation problems. For example, referring to FIG. 2, the root set of a garbage collector can be augmented to include pointers to memory objects that are allocated through in native memory 108. The garbage collector operates on objects within garbage-collected heap 106 as usual. While operating on objects located in native memory 108 (outside of garbage-collected heap 106), the garbage collector must take into account the fact that pointers to these objects may skip the object headers (as is illustrated in FIG. 2) while manipulating pointers during garbage collection operations on these objects.

Note that the above-described technique only works if the system avoids performing garbage collection operations while the objects being garbage-collected are being referenced by another process. Hence, the above-described technique generally works for virtual machines running on uniprocessor systems that do not provide preemptive scheduling inside or below the virtual machine layer.

Redirecting External Memory Allocation Operations

Figure 3:
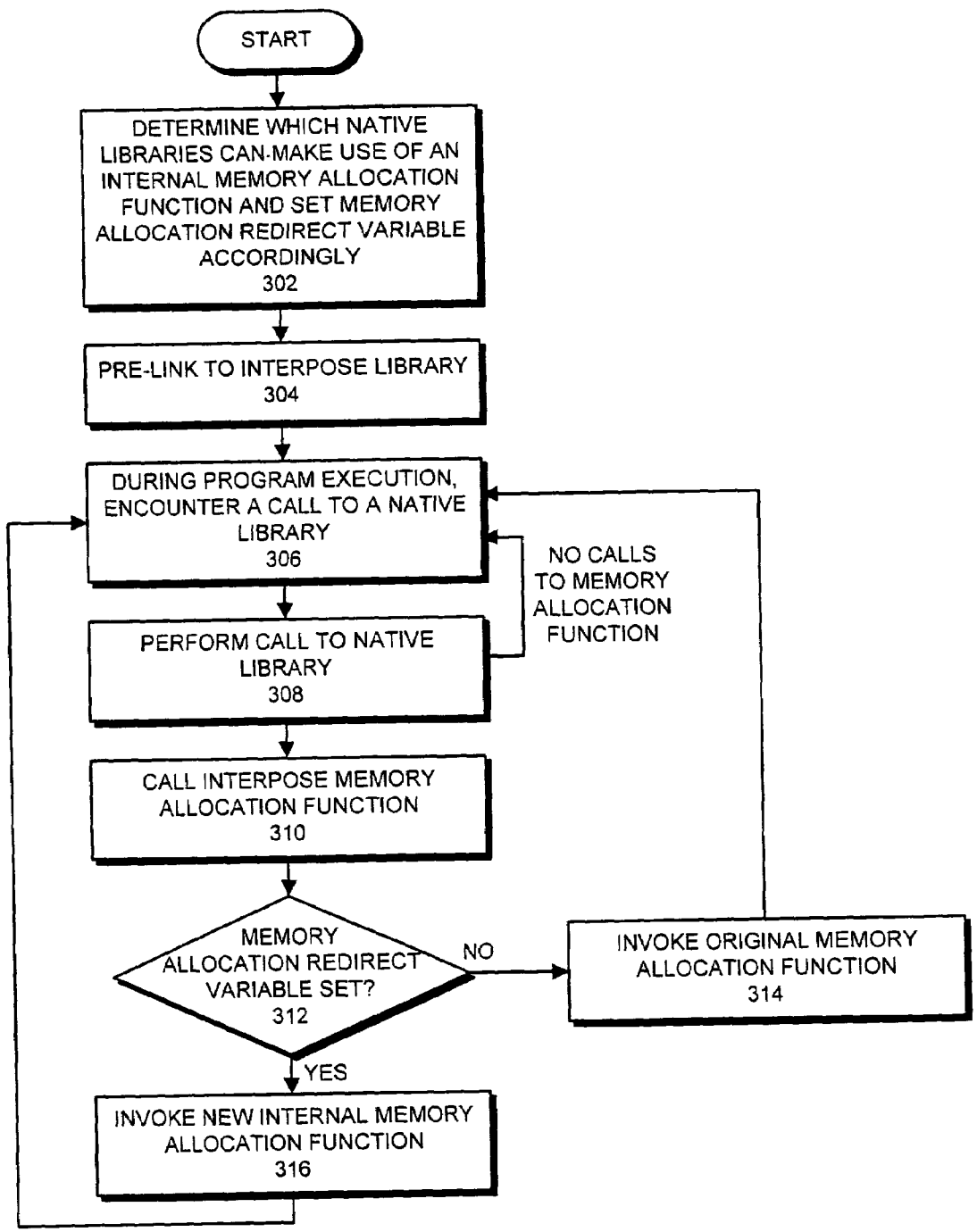
FIG. 3 presents a flowchart illustrating the process of redirecting external memory allocation operations in accordance with an embodiment of the present invention.

FIG. 3 presents a flowchart illustrating the process of redirecting external memory allocation operations in accordance with an embodiment of the present invention.

Before the execution of the application, a programmer determines whether a native library can make use of an internal memory allocation function to allocate memory (step 302). The programmer does this by determining if the library allocates memory. If so, the programmer determines if the allocated memory is used in a way that complicates garbage collection. For example, if there are external references to the allocated memory blocks, the memory blocks can be modified by external code, and hence cannot be controlled by an internal memory manager. If the native library does not allocate memory, or does so in a way that does not complicate internal garbage collection, the programmer sets an allocation redirect variable for the function.

The application is them pre-linked with an interpose library created for the purpose of intercepting the function calls (step 304). This causes any calls to a memory allocation function to be intercepted by an interpose memory allocation function.

Next, during program execution, the system encounters a call to a native library function (step 306), and the system calls to the native library function (step 306). If the native library function does not cause a call to the memory allocation function, the system returns to step 306 to continue executing the program.

Otherwise, the native library function causes the interpose memory allocation function to be called. This interpose memory allocation function determines the value of the allocation redirect variable for the function set in step 302 (step 312). If the allocation redirect variable is set, the system invokes the new internal memory allocation function (step 316) and returns to step 304. Otherwise, the system invokes the original memory allocation function (step 314) and returns to step 304.

For example, referring to the pseudo-code in Table 1 below, a new "malloc" function called by the native library first performs a lookup for an original system malloc function, if the pointer to the original function is NULL. Next, if a redirect switch is set, the application calls internal code within the application to perform the allocation operation. Otherwise, the system calls the original system malloc function.

TABLE 1

```
static void* (*orig) (size_t)
malloc(params) {
    if orig==NULL) {
        orig=lookup("malloc");
    }
    if(redirect_switch==1) {
        execute internal allocation code
    }
    else return (*orig) (params);
}
```

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for redirecting external memory allocation operations, generated during calls by an application to external library functions, to an internal memory manager within the application, comprising:
   encountering a call to an external library function that performs a memory allocation operation during execution of the application;
   determining if the external library function can call to an internal memory allocation function within the application that allocates memory from a pool that is managed by the application, wherein determining if the external library function can call an internal memory allocation function involves reading a pre-determined indicator value, which indicates whether the external library function can call the internal memory allocation function, and wherein the method further comprises pre-determining a value for the pre-determined indicator value by examining the external library function to determine whether the external library function or a function called by the external library function will call a memory allocation function, and whether there are external references to external memory blocks allocated by the external library function; and
   if so,
      redirecting the call to the internal memory allocation function, and
      allocating the memory using the internal memory allocation function so that memory can be allocated from the pool that is managed by the application.

2. The method of claim 1, wherein the application is a platform-independent virtual machine.

3. The method of claim 1, wherein the application runs in single-threaded mode on a computing device.

4. The method of claim 1, wherein the application runs on a memory-constrained computing device.

5. The method of claim 1, wherein redirecting the call to the internal memory allocation function involves executing an interpose function that calls the internal memory allocation function.

6. The method of claim 1, further comprising garbage collecting memory allocated by the internal memory allocation function.

7. The method of claim 1, wherein the internal memory allocation function allocates memory in a heap.

8. A computer-readable storage medium storing instructions that when executed by a computer cause the computer to perform a method for redirecting external memory allocation operations, generated during calls by an application to external library functions, to an internal memory manager within the application, the method comprising:
   encountering a call to an external library function that performs a memory allocation operation during execution of the application;
   determining if the external library function can call to an internal memory allocation function within the application that allocates memory from a pool that is managed by the application, wherein determining if the external library function can call an internal memory allocation function involves reading a pre-determined indicator value, which indicates whether the external library function can call the internal memory allocation function, and wherein the method further comprises pre-determining a value for the pre-determined indicator value by examining the external library function to determine whether the external library function or a function called by the external library function will call a memory allocation function, and whether there are external references to external memory blocks allocated by the external library function; and
   if so,
      redirecting the call to the internal memory allocation function, and
      allocating the memory using the internal memory allocation function so that memory can be allocated from the pool that is managed by the application.

9. The computer-readable storage medium of claim 8, wherein the application is a platform-independent virtual machine.

10. The computer-readable storage medium of claim 8, wherein the application runs in single-threaded mode on a computing device.

11. The computer-readable storage medium of claim 8, wherein the application runs on a memory-constrained computing device.

12. The computer-readable storage medium of claim 8, wherein redirecting the call to the internal memory allocation function involves executing an interpose function that calls the internal memory allocation functions.

13. The computer-readable storage medium of claim 8, wherein the method further comprises garbage collecting memory allocated by the internal memory allocation function.

14. The computer-readable storage medium of claim 8, wherein the internal memory allocation function allocates memory in a heap.

15. An apparatus for redirecting external memory allocation operations, generated during calls by an application to external library functions, to an internal memory manager within the application, comprising:
   an execution mechanism configured to execute a call to an external library function that performs a memory allocation operation during execution of the application;
   a determination mechanism configured to determine if the external library function can call to an internal memory allocation function within the application that allocates memory from a pool that is managed by the application, wherein determining if the external library function can call an internal memory allocation function involves reading a pre-determined indicator value, which indicates whether the external library function can call the internal memory allocation function;
   a precomputation mechanism configured to precompute the pre-determined indicator value by examining the external library function to determine whether the external library function or a function called by the external library function will call a memory allocation function, and whether there are external references to external memory blocks allocated by the external library function;
   a redirection mechanism configured to redirect the call to the internal memory allocation function; and
   an internal memory allocation function configured to allocate memory so that memory can be allocated from the pool that is managed by the application.

16. The apparatus of claim 15, wherein the application is a platform-independent virtual machine.

17. The apparatus of claim 15, wherein the application runs in single-threaded mode on a computing device.

18. The apparatus of claim 15, wherein the application runs on a memory-constrained computing device.

19. The apparatus of claim 15, wherein the redirection mechanism is further configured to execute an interpose function that calls the internal memory allocation functions.

20. The apparatus of claim 15, further comprising a garbage collection mechanism configured to garbage collect memory allocated by the internal memory allocation function.

21. The apparatus of claim 15, wherein the internal memory allocation function allocates memory in a heap.

* * * * *